(12) United States Patent
Agraharam et al.

(10) Patent No.: US 6,208,729 B1
(45) Date of Patent: Mar. 27, 2001

(54) METHOD AND APPARATUS FOR ON-HOLD SWITCHING

(75) Inventors: Sanjay Agraharam, Marlboro; Randy G. Goldberg, Princeton; Robert Edward Markowitz, Glen Rock; Kenneth H. Rosen, Middletown; David Hilton Shur, Aberdeen, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/174,013

(22) Filed: Oct. 16, 1998

(51) Int. Cl.[7] .................................................. H04M 3/00
(52) U.S. Cl. ........................... 379/266; 379/265; 379/309
(58) Field of Search ................................... 379/210, 215, 379/265, 266, 309

(56) References Cited

U.S. PATENT DOCUMENTS

| | | | |
|---|---|---|---|
| 5,526,416 | * 6/1996 | DeZonno et al. | 379/266 X |
| 5,724,418 | * 3/1998 | Brady | 379/266 X |
| 5,978,467 | * 11/1999 | Walker et al. | 379/266 |
| 5,987,116 | * 11/1999 | Petrunka et al. | 379/266 X |
| 6,014,439 | * 1/2000 | Walker et al. | 379/266 |

\* cited by examiner

*Primary Examiner*—Creighton Smith

(57) ABSTRACT

The invention provides an on-hold switching device that permits a subscriber to be engaged in other activities through a telephone network while being placed on-hold by another party. When placed on-hold, the on-hold switching device disconnects the subscriber from the other party and connects the subscriber to the telephone network so that the subscriber may engage in other activities. The on-hold switching device monitors the signal bus connected to the other party to determine whether the on-hold condition is removed. When the on-hold condition is removed, the subscriber is reconnected to the other party. Thus, the on-hold switching device permits a subscriber to be engaged in other activities when placed on-hold by the other party.

16 Claims, 7 Drawing Sheets

METHOD AND APPARATUS FOR ON-HOLD SWITCHING

BACKGROUND OF THE INVENTION

1. Field of Invention

This invention relates to an on-hold switching device.

2. Description of Related Art

Conventional telephone systems provide convenient on-hold features where a first party may place a second party on-hold while the first party performs other tasks such as searching or developing information requested by the second party. With the common use of automatic answering devices used by mail order houses, for example, a calling party is often placed on-hold until an operator becomes available to interact with the calling party. Unfortunately, the time the first party is placed on-hold may be unduly. Accordingly, new technology is required to alleviate this undesirable and often unproductive wait time.

SUMMARY OF THE INVENTION

The invention provides an on-hold switching device that permits a subscriber to be engaged in other activities on a telephone network while being placed on-hold by another party. The on-hold switching device receives information from either a terminal (a telephone station, for example) of the subscriber or a terminal (a private branch exchange, for example) of the other party that the call has been placed on-hold. When such information has been received, the on-hold switching device disconnects the subscriber from the other party and connects the subscriber to another call so that the subscriber may engage in other activities. While the call is placed on-hold, the on-hold switching device monitors a signal bus connected to the other party to determine whether the on-hold condition is removed. When the on-hold condition is removed, the on-hold switching device reconnects the subscriber to the other party and either places the activity engaged in by the subscriber on-hold or terminates the activity. Thus, the on-hold switching device permits a subscriber to be engaged in other activities when placed on-hold by the other party.

BRIEF DESCRIPTION OF THE DRAWINGS

The invention is described in detail with regard to the following figures wherein like numerals reference like elements, and wherein.

DETAILED DESCRIPTION OF PREFERRED EMBODIMENTS

Figure 1:
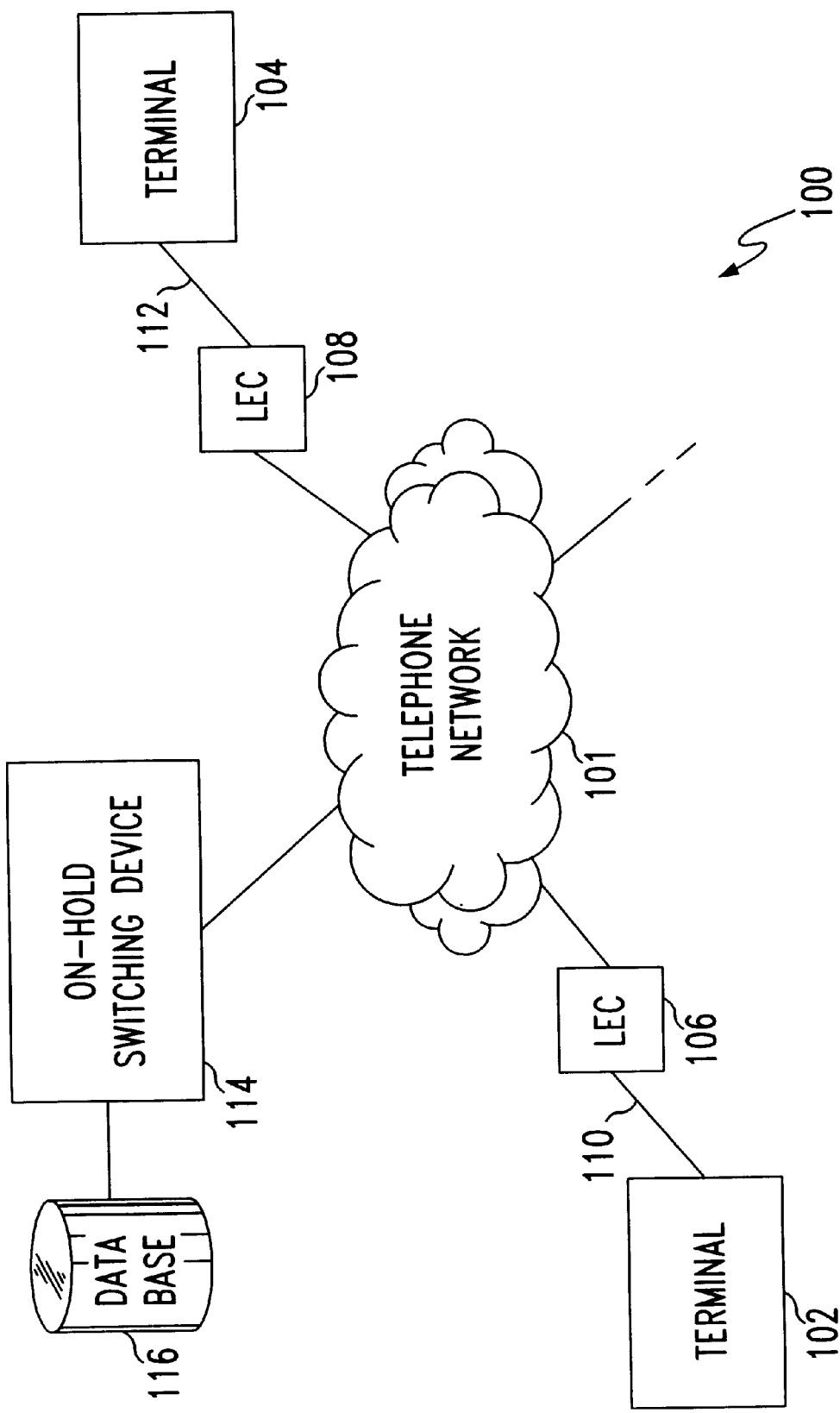
FIG. 1 is a block diagram of an on-hold switching system.

FIG. 1 shows a block diagram of an on-hold switching system 100 that includes terminals 102 and 104 coupled to a telephone network 101 through signal buses 110 and 112 and local exchange carriers (LECs) 106 and 108, respectively. The terminals may be telephone stations or Private Branch Exchanges (PBX), for example. An on-hold switching device 114 is also coupled to the telephone network 101 and a database 116 is coupled to the on-hold switching device 114. While FIG. 1 shows the on-hold switching device 114 and the database 116 as centralized units, the on-hold switching device 114 and the database 116 may be distributed in the telephone network 101. For ease of discussion below, the centralized configurations as shown in FIG. 1 are assumed.

When a first party (subscriber) using the terminal 104 calls a second party at the terminal 102, the call is routed through the on-hold switching device 114. If the second party at the terminal 102 places the call on-hold, the on-hold switching device 114 detects the on-hold condition and disconnects the terminal 104 from the terminal 102 and switches the terminal 104 to another connection through the telephone network 101 for another call, for example.

When the terminal 104 is placed on-hold, the on-hold switching device 114 retrieves a subscriber profile from the database 116 and connects the terminal 104 to other services through the telephone network 101 so that the subscriber at terminal 104 may engage in other activities through the telephone network 101 while the call is on-hold with respect to the terminal 102. The on-hold switching device 114 monitors the on-hold condition applied by the terminal 102 to detect when the on-hold condition is removed while the terminal 104 is engaged in the other activities. When the on-hold condition is removed, the on-hold switching device 114 reconnects terminal 102 with terminal 104 and places on-hold (or terminates) the activity that the subscriber was engaged in while waiting for the on-hold condition to be removed. Thus, the on-hold switching device 114 permits a subscriber to engage in other activities while being placed on-hold by the second party without disrupting the call with the second party.

Figure 2:
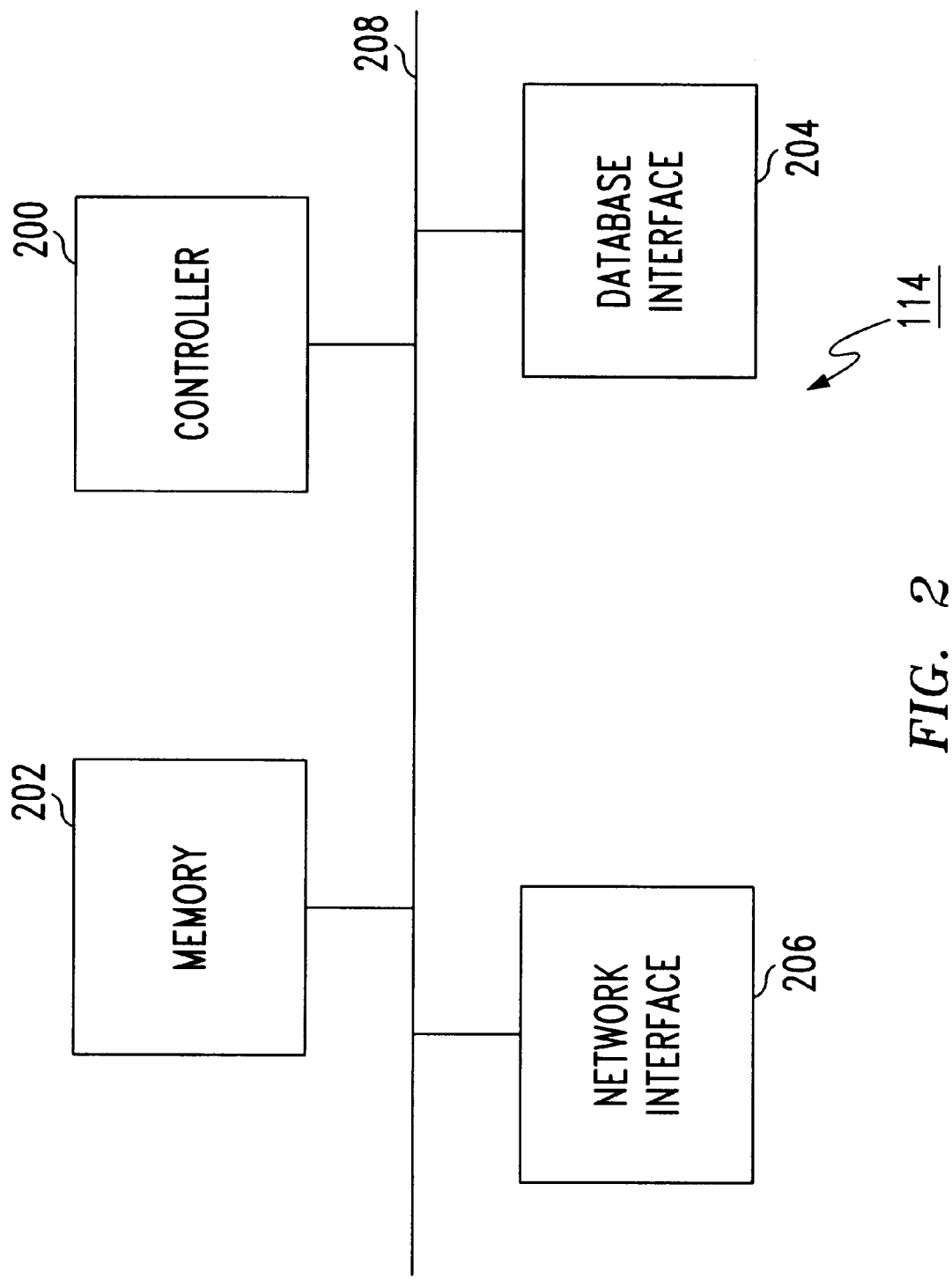
FIG. 2 is a block diagram of an on-hold switching device.

FIG. 2 shows a block diagram of the on-hold switching device 114. The on-hold switching device 114 includes a controller 200, a memory 202, a database interface 204 and a network interface 206. The above components are coupled together through signal bus 208.

When the subscriber at the terminal 104 calls a called party at the terminal 102, the call is routed through the on-hold switching device 114. When the terminal 102 places the call on-hold, the controller 200 of the on-hold switching device 114 detects the condition by receiving signals sent by either the terminal 102 or the terminal 104.

If the terminal 102 is an integrated services digital network (ISDN) capable device, then the terminal 102 may send a special message (Q.931 signal, for example) to the controller 200 when the terminal 102 places that the call on-hold. If the terminal 102 is not an ISDN capable device, then the terminal 102 may be connected to the on-hold switching device 114 through an additional signaling connection other than the connection used by the call between the terminals 104 and 102. This additional connection may be included in the signal bus 110.

The controller 200 may be informed of on-hold condition by the terminal 104. When the terminal 102 places the call on-hold, the subscriber at the terminal 104 may dial a special code that is received by the controller 200. When the special code is received, the controller 200 breaks the connection between the terminals 104 and 102 through the network interface 206 and then connects the terminal 104 to other functions available in the telephone network 101 based on a subscriber profile.

The controller 200 retrieves the subscriber profile from the database 116 through the database interface 204. The subscriber profile may contain preferences previously specified by the subscriber that directs the controller 200 to connect the terminal 104 to features selected by the subscriber. For example, the subscriber profile may direct the controller 200 to connect the terminal 104 to the subscriber's mailbox located in the telephone network 101 when a call is placed on-hold. The subscriber profile may direct the controller 200 to prompt the subscriber to select one of several options.

TABLE I

| Code | Selection |
|---|---|
| # 00 | Mailbox |
| # 01 | Dial Tone |
| # 02 | Weather |
| # 03 | Office |
| # 04 | Home |

Table I above shows exemplary codes that may be entered by the subscriber and the corresponding functions that may be performed. For example, #00 may direct the controller 200 to connect the terminal 104 to the subscriber mailbox; and #01 may direct the controller 200 to return a dial tone to the terminal 104 so the subscriber may make another call. The subscriber may use this option to call a training service, for example, where the subscriber may have obtained a training service using a training tape and the subscriber may continue a training session that was previously suspended. #02 may direct the controller 200 to immediately dial a preset number such as a weather service number or stock quote service number, for example. After the subscriber profile is retrieved, the controller 200 executes the appropriate functions and permits the subscriber to be engaged in other activities as long as the original call between the terminals 104 and 102 is on-hold.

While the terminal 104 is engaged in other activities, the controller 200 continues to monitor the on-hold condition. For example, many private branch exchanges (PBX) plays music for a caller while placing the caller on-hold. When a call is removed from the on-hold condition, the music is replaced by a telephone ring signal which is then answered by an operator. Thus, when a telephone ring signal is detected, the controller 200 may reconnect the terminal 104 to the terminal 102 and places on-hold (or terminates) the other activity engaged in by the subscriber while the on-hold condition was active. If the terminal 102 is ISDN capable, then the terminal 102 may send a signal to the controller 200 to indicate that the on-hold condition is removed.

If the terminal 102 places the call on-hold again, the controller 200 again breaks the connection between the terminals 104 and 102 and reconnects the terminal 104 to the other activity that was placed on-hold when the terminals 102 and 104 were reconnected or permits the subscriber to select another activity. This sequence may be continued indefinitely until the call between the terminals 102 and 104 is completed. After the call between the terminals 102 and 104 is completed, the terminal 104 may continue the other activity that was started during the on-hold condition between the terminals 104 and 102. The controller 200 monitors this new call for the on-hold condition and continues this on-hold process until the terminal 104 goes on-hook.

Figure 3:
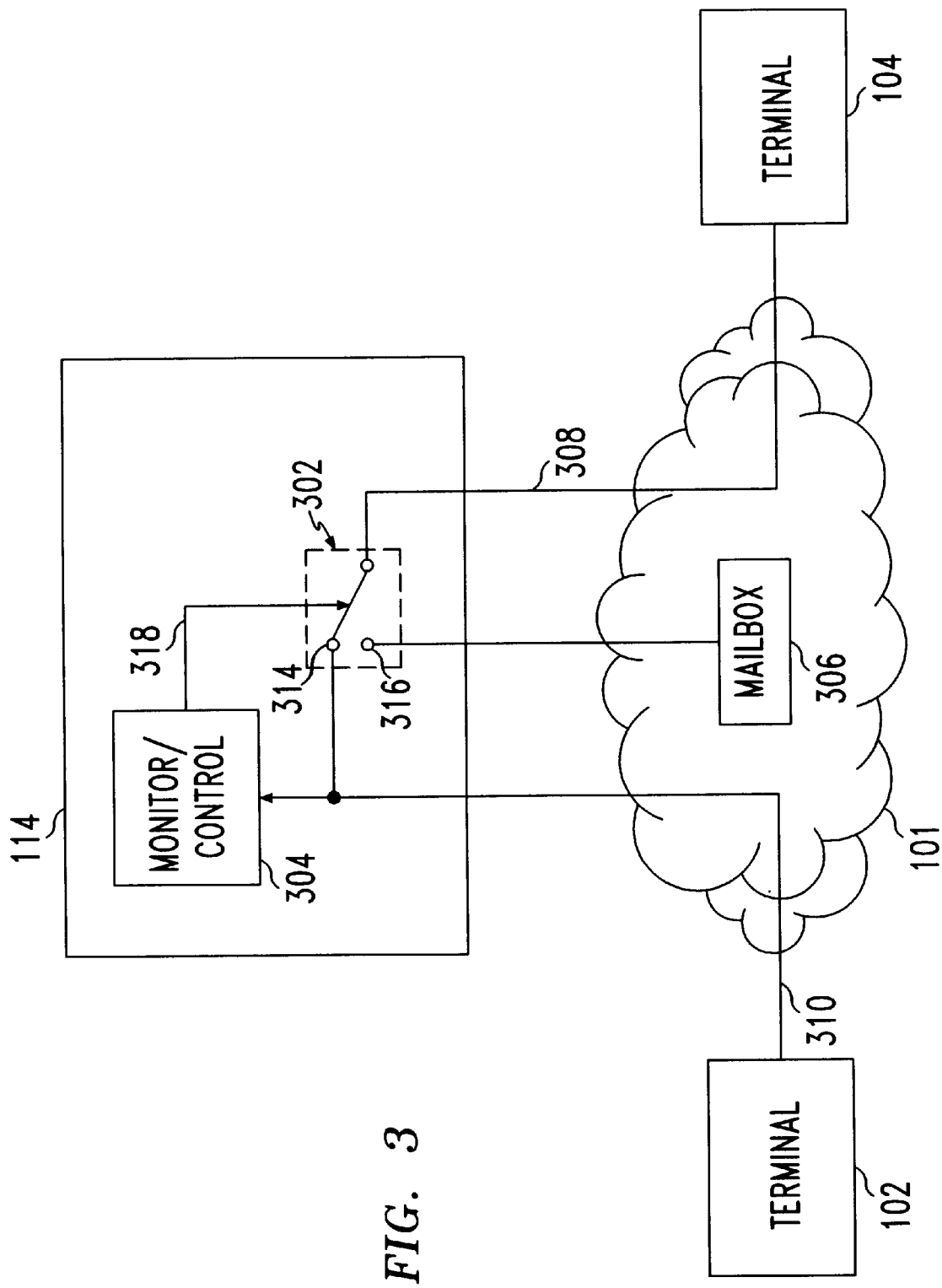
FIG. 3 is a block diagram of a first embodiment of the on-hold switching system.

FIG. 3 shows a schematic diagram of a first exemplary embodiment of the on-hold switching device 114. The terminal 102 is an ISDN capable device and coupled to the on-hold switching device 114 through line 310. When the call between the terminals 104 and 102 is placed on-hold by the terminal 102, an ISDN signal is sent from the terminal 102 to the on-hold switching device 114 to indicate that the call is placed on-hold. A monitor/control function 304 of the on-hold switching device 114 then controls a switch 302 through a signal bus 318 to switch a signal line 308 connected to the terminal 104 from the contact 314 to the contact 316, thus disconnecting the terminal 104 from the terminal 102 and connecting the terminal 104 directly to the telephone network 101 so that the terminal 104 may engage in other activities such as a mailbox service 306 shown in FIG. 3. The switch 302 may be symbolic and may represent the switching function being performed. The monitor/control 304 continues to monitor the signal line 310 to determine whether the on-hold condition has been removed. When a signal is received indicating that the on-hold condition is removed, the monitor/control 304 controls the switch 302 via signal bus 318 to switch the signal line 308 from the contact 316 to the contact 314 reconnecting the terminal 104 to the terminal 102. The activity that the terminal 104 was engaged in such as the mailbox service 306 is then placed on-hold, or terminated, as specified by the subscriber profile.

Figure 4:
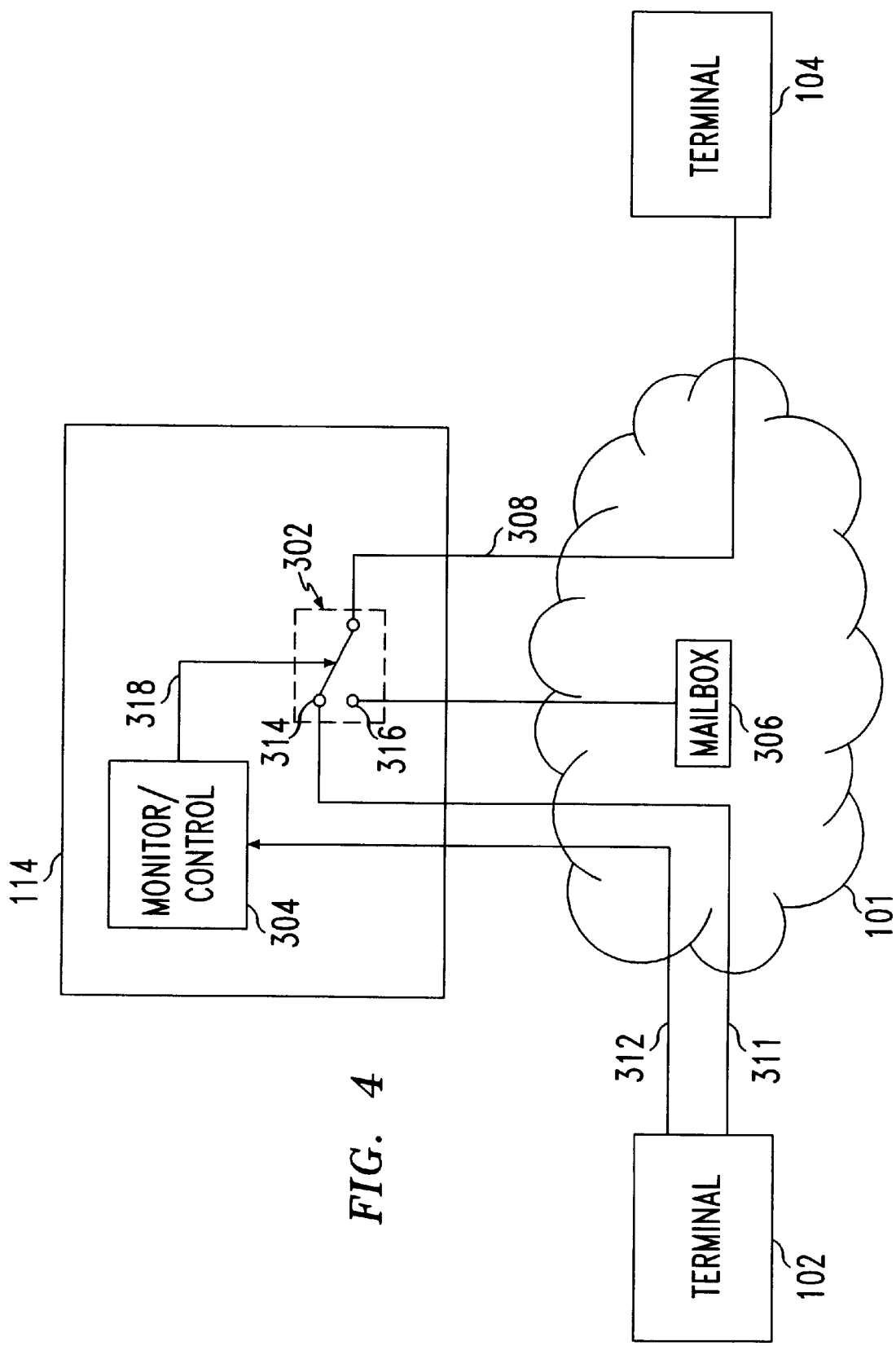
FIG. 4 is a second embodiment of the on-hold switching system.

FIG. 4 shows a second exemplary embodiment where the terminal 102 is not ISDN capable and is connected to the telephone network 101 via two signal buses 311 and 312. The signal bus 311 is part of the signal path connecting the terminal 104 and 102 in a call and signal bus 312 is coupled to the on-hold switching device 114 for communicating signals that indicate the on-hold condition. When the terminal 104 calls the terminal 102, the two terminals 104 and 102 are connected to each other through the switch 302. The monitor/control 304 of the on-hold switching device 114 monitors the signal bus 312 to determine whether the on-hold condition has been asserted or removed.

When the terminal 102 places the call between the terminals 102 and 104 on-hold, an on-hold signal is sent by the terminal 102 to the monitor/control 304 through the signal bus 312. When the on-hold signal is received, the monitor/control 304 controls the switch 302 through the signal bus 318 to change the switch 302 from the contact 314 to the contact 316, which permits the terminal 104 to engage in other activities (e.g., mailbox service 306 or another call) using the telephone network 101. The monitor/control 304 continues to monitor the signal bus 312 until a signal is received from the terminal 102 indicating that the on-hold condition is removed. When such a signal is received, the monitor/control 304 controls the switch 302 to switch from the contact 316 to the contact 314 to reconnect the terminal 104 to the terminal 102 and places on-hold (or terminates) the other activity engaged in by the subscriber while the terminal 104 is on-hold with respect to the terminal 102.

Figure 5:
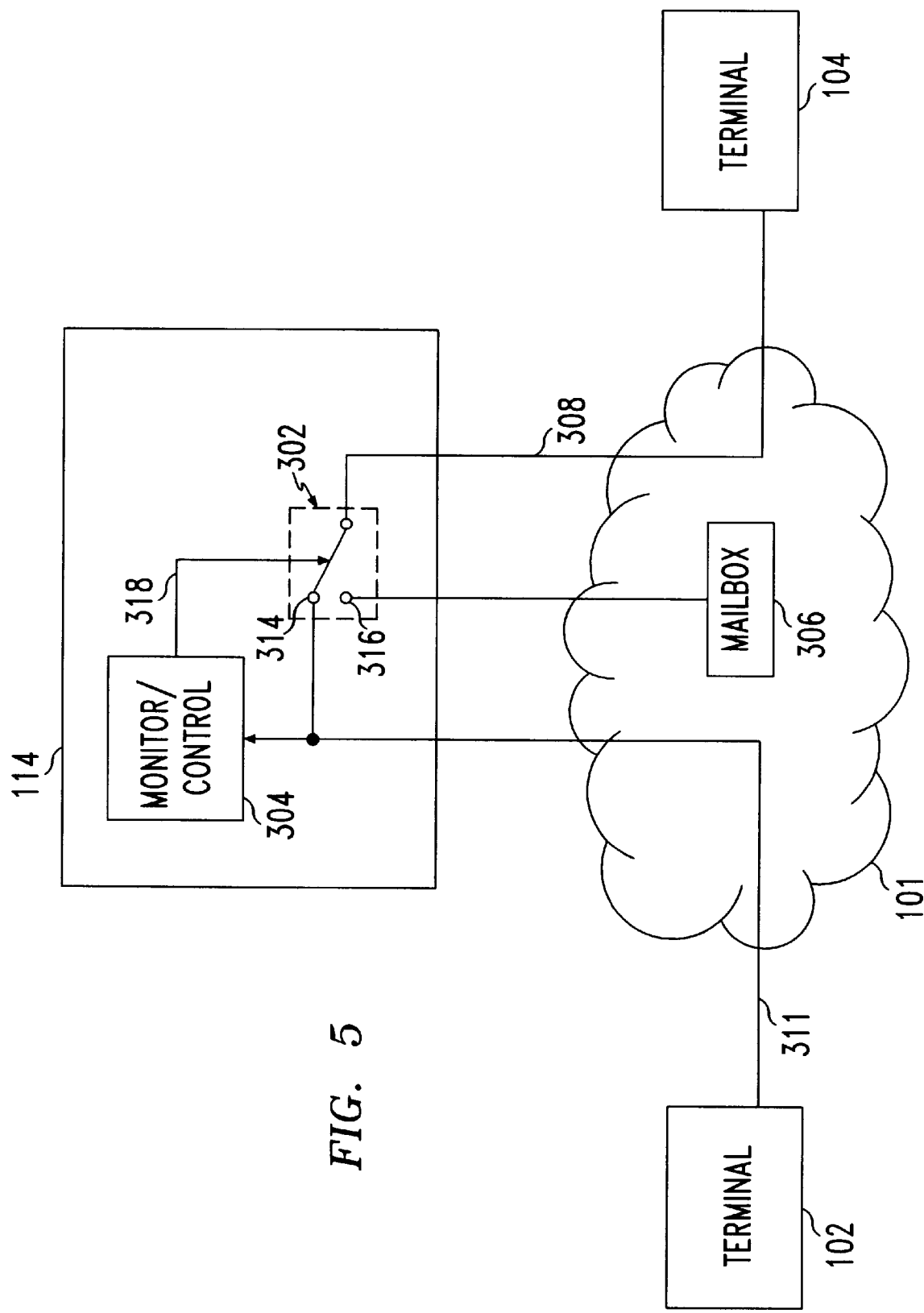
FIG. 5 is a third embodiment of the on-hold switching system.

FIG. 5 shows a third embodiment where both the terminals 104 and 102 are connected to the telephone network 101 via signal buses 308 and 311 and the terminal 102 is not ISDN capable. When the terminals 104 and 102 are engaged in a call, the switch 302 is controlled by the monitor/control 304 to be in the contact 314 position. When the terminal 102 places the call on-hold and the subscriber at terminal 104 desires to engage in other activities, the subscriber enters a special code such as #00 which is received by the monitor/control 304. When such a special code is received, the monitor/control 304 controls the switch 302 to switch from contact 314 to contact 316 disconnecting the terminal 104 from the terminal 102 and connecting the terminal 104 to the telephone network 101. In this condition, the subscriber may engage in other activities such as reviewing messages in the mailbox 306.

The monitor/control 304 continues to monitor the signals on signal bus 311 to determine whether the terminal 102 has removed the on-hold condition. For example, the monitor/control 304 may detect a ringing signal that is output by the terminal 102. Other types of detection may also be implemented such as detecting when special signals such as musical signals or non-signals such as "quiet" have ended. Also, the terminal 102 may output a special sequence of signals to indicate that the on-hold condition is being terminated. When the on-hold condition is terminated, the monitor/control 304 switches the switch 302 from the contact 316 to the contact 314 to reconnect the terminal 104 to the terminal 102 and either terminates or places on-hold the other activity that the subscriber was engaged in while the call between the terminals 102 and 104 was placed on-hold.

Figure 6:
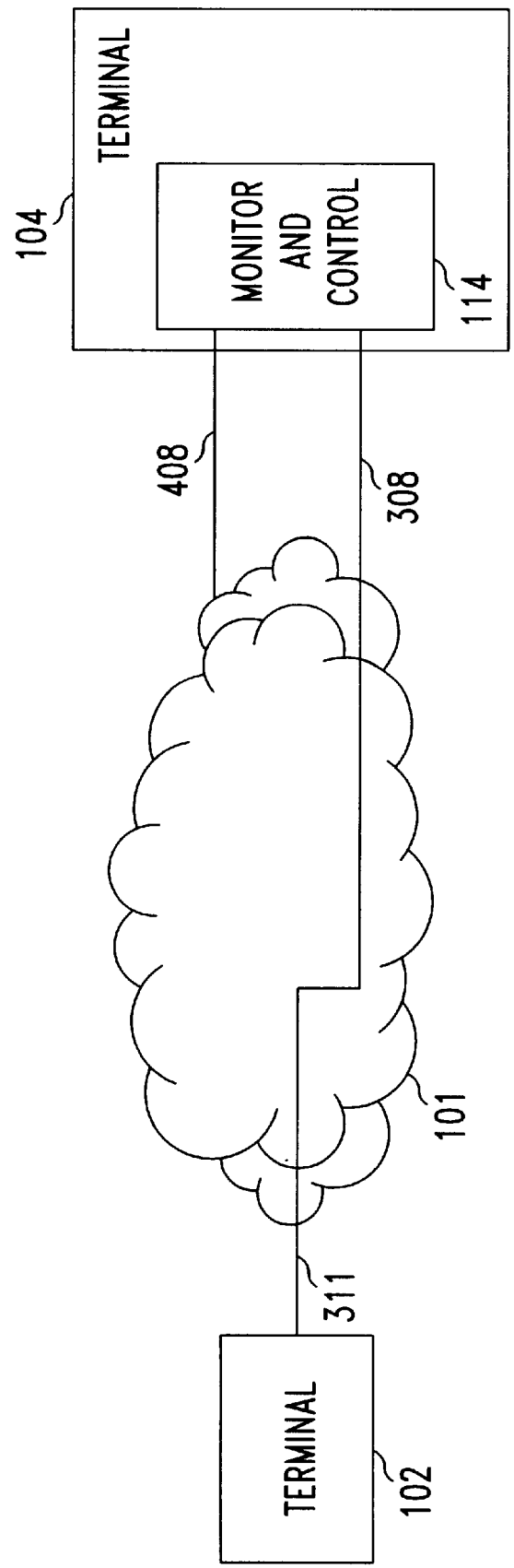
FIG. 6 is a fourth embodiment of the on-hold switching system.

FIG. 6 shows a fourth embodiment where the terminal 104 includes two signal bus connections 308 and 408 to the telephone network 101. The on-hold device 114 may be located near the terminal 104 or actually incorporated as part of the terminal 104, as shown in FIG. 6. When the terminal 104 calls the terminal 102, for example, the terminals 104 and 102 are connected to each other through the signal buses 308, 311 and the telephone network 101. When the terminal 102 places the call on-hold, the subscriber using terminal 104 may enter a special control code directing the on-hold switching device 114 to switch to the signal bus 408 so that the subscriber may engage in other activities. When such a code is received, the controller 200 of the on-hold switching device 114 connects the subscriber to the telephone network 101 through the signal bus 408 and monitors the signal bus 308 to determine when the on-hold condition is removed.

For example, the controller 200 may detect when a ringing signal is received through the signal bus 308 indicating that the on-hold condition has been removed. Other signals may also be used to indicate the removal of the on-hold condition such as a special signal transmitted by the terminal 102 or the telephone network 101. When the on-hold condition is removed, the controller 200 switches the terminal 104 to the signal bus 308 and either places the activity engaged on the signal bus 408 on-hold or terminates that activity.

As described above, the on-hold switching device 114 permits a subscriber to be engaged in other activities through the telephone network 101 while being placed on hold. The on-hold switching device 114 may be an independent unit coupled to the telephone network 101 that is placed in the path connecting terminals 104 and 102 or may be incorporated in the terminal 104 or located near the terminal 104.

Figure 7:
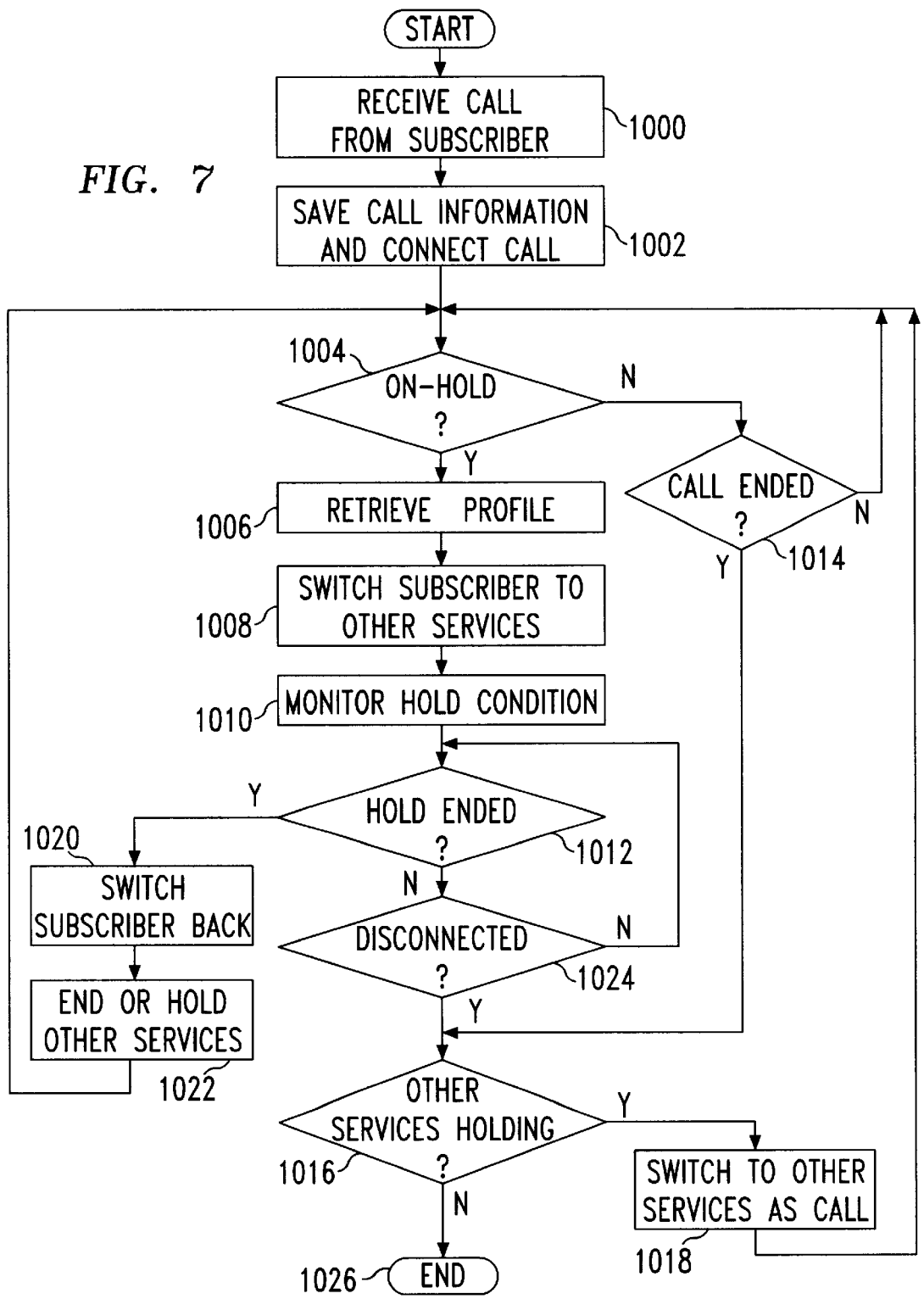
FIG. 7 is a flowchart of a process of the on-hold switching device.

FIG. 7 shows a flowchart of a process for the on-hold switching device 114 when configured as an independent unit, as shown in FIG. 1. In step 1000, the on-hold switching device 114 receives a call from the subscriber, and goes to step 1002. In step 1002, the on-hold switching device 114 saves call information such as automatic name identification (ANI) and the called party telephone number and connects the call to the called party, and goes to step 1004. In step 1004, the on-hold switching device 114 determines whether the call has been placed on-hold. If the call has been placed on-hold, the on-hold switching device 114 goes to step 1006; otherwise the on-hold switching device 114 goes to step 1014. In step 1014, the on-hold switching device 114 determines whether the call has ended such as receiving an on-hook signal. If the call has ended, the on-hold switching device 114 goes to step 1016; otherwise, the on-hold switching device returns to step 1004.

In step 1006, the on-hold switching device 114 retrieves the subscriber profile from the database 116 and goes to step 1008. In step 1008, the on-hold switching device 114 switches the subscriber to another line of the telephone network 101 and connects the subscriber to other services as specified in the subscriber profile and goes to step 1010. In step 1010, the on-hold switching device 114 monitors the on-hold condition by the various methods discussed above and goes to step 1012. In step 1012, the on-hold switching device 114 determines whether the on-hold condition has ended. If ended, the on-hold switching device 114 goes to step 1020; otherwise, the on-hold switching device 114 goes to step 1024.

In step 1020, the on-hold switching device 114 switches the subscriber back to the called party and goes to step 1022. In step 1022, the on-hold switching device 114 terminates or places on-hold the other activity that was engaged in by the subscriber and returns to step 1004.

In step 1024, the on-hold switching device 114 determines whether the call between the subscriber and the called party has been disconnected. If disconnected, the on-hold switching device 114 goes to step 1016; otherwise, the on-hold switching device 114 returns to step 1012. In step 1016, the on-hold switching device 114 determines whether there is another service that had been placed on-hold when the subscriber was switched back to the called party. If there is another service placed on-hold, the on-hold switching device 114 goes to step 1018; otherwise, the on-hold switching device 114 goes to step 1026 and ends the process. In step 1018, the on-hold switching device switches the subscriber to the other service and establishes the new connection as the call and returns to step 1004.

While this invention has been described in conjunction with specific embodiments thereof, it is evident that many alternatives, modifications, and variations will be apparent to those skilled in the art. For example, the discussion assumed that the subscriber is a calling party. However, the invention operates similarly when the subscriber is a called party and the calling party places the subscriber on-hold. Accordingly, preferred embodiments of the invention as set forth herein are intended to be illustrative, not limiting. Various changes may be made without departing from the spirit and scope of the invention.

What is claimed is:

1. A method for processing a first call between a first party and a second parity in a telephone network, comprising:

switching the first party for a second call when the first call is placed on-hold by an on-hold switching device of the telephone network based on a subscriber profile;

monitoring the on-hold condition to determine whether the on-hold condition is removed and;

switching the first party back to the second party when the on-hold condition is removed.

2. The method of claim 1, further comprising one of receiving a signal from a terminal of the second party indicating that the first call is placed on-hold or receiving a signal from a terminal of the first party indicating that the first call is placed on-hold.

3. The method of claim 2, wherein the receiving a signal from a terminal of the second party step comprises one of receiving an Integrated Services Digital Network (ISDN) signal indicating the on-hold condition or receiving a signal from a connection separate from a connection of the first call indicating the on-hold condition.

4. The method of claim 2, wherein terminals of the first and the second parties include a telephone station and a private branch exchange.

5. The method of claim 1, wherein the first party is switched to the second call based on a subscriber profile.

6. The method of claim 1, wherein the second call is placed on-hold or terminated when the on-hold condition is removed.

7. The method of claim 1, wherein the monitoring the on-hold condition step comprises one of receiving a signal from a terminal of the second party indicating that the on-hold condition is removed, receiving a signal from a terminal of the first party indicating that the on-hold condition is removed, or detecting a signal in a connection to the terminal of the second party indicating that the on-hold condition is removed.

8. The method of claim 1, wherein the switching the first party step comprises switching the first party from a first line connecting the first party to the second party to a second line connecting the first party to the telephone network.

9. An on-hold switching device of a telephone network, comprising:

a memory; and a controller coupled to the memory, wherein a first party is connected to a second party in a first call and the controller switches the first party for a second call, based on a subscriber profile, when the first call is placed on-hold, monitors the on-hold condition to determine whether the on-hold condition is removed, and switches the first party to the second party when the on-hold condition is removed.

10. The device of claim 9, wherein the controller one of receives a signal from a terminal of the second party indicating that the first call is placed on-hold or receives a signal from a terminal of the first party indicating that the first call is placed on-hold.

11. The device of claim 10, wherein the controller one of receives an Integrated Services Digital Network (ISDN) signal indicating the on-hold condition or receives a signal from a connection separate from a connection of the first call indicating the on-hold condition.

12. The device of claim 10, wherein terminals of the first and the second parties include a telephone station and a private branch exchange.

13. The device of claim 10, wherein the subscriber profile indicates that the second call is directed to at least one of a mailbox, a training session, and a third party.

14. The device of claim 10, wherein the second call is placed on-hold or terminated when the on-hold condition is removed.

15. The device of claim 9, wherein the controller one of: 1) receives a signal from a terminal of the second party indicating that the on-hold condition is removed, 2) receives a signal from a terminal the first party indicating that the on-hold condition is removed, or 3) detects a signal in a connection to the terminal of the second party indicating that the on-hold condition is removed.

16. The device of claim 9, wherein a terminal of the first party includes a first line and a second line, the controller switching the first party from the first line connecting the first party to the second party to the second line connecting the first party to the telephone network.

* * * * *